United States Patent [19]

Imura et al.

[11] 4,166,681

[45] Sep. 4, 1979

[54] CAMERA INCORPORATING AN ELECTRONIC FLASH DEVICE

[75] Inventors: Toshinori Imura; Akira Yamanaka, both of Sakai, Japan

[73] Assignee: Minolta Camera Kabushiki Kaisha, Osaka, Japan

[21] Appl. No.: 801,195

[22] Filed: May 27, 1977

[30] Foreign Application Priority Data

Jun. 11, 1976 [JP] Japan .............................. 51-76726[U]

[51] Int. Cl.² .......................... G03B 3/00; G03B 9/02; G03B 15/05
[52] U.S. Cl. .................................... 354/149; 354/196; 354/273; 354/289
[58] Field of Search ............... 354/139, 149, 196, 270, 354/273, 289

[56] References Cited

U.S. PATENT DOCUMENTS

| Re. 26,763 | 1/1970 | Hennig et al. | 354/149 |
|---|---|---|---|
| 3,205,801 | 9/1965 | Peterson | 354/139 |
| 3,257,920 | 6/1966 | Greger et al. | 354/149 |
| 3,273,479 | 9/1966 | Jakob | 354/149 |

Primary Examiner—Michael L. Gellner
Attorney, Agent, or Firm—Wolder, Gross & Yavner

[57] ABSTRACT

A camera incorporating an electronic flash device includes a flash emitting portion which is urged by a spring toward a projecting position and is normally locked in a retracted position against the influence of the spring. The flash emitting portion is released from the locked condition to move to the projecting position, when a diaphram setting member is set to a predetermined position, with other preparatory operations necessary for flash photography being effected in relation with the movement of the flash emitting portion. The flash emitting portion may be pushed back to return to its retracted position, and the diaphragm setting member is thereby automatically reset to its normal position with the other camera mechanisms being reset to a condition for daylight photography.

15 Claims, 8 Drawing Figures

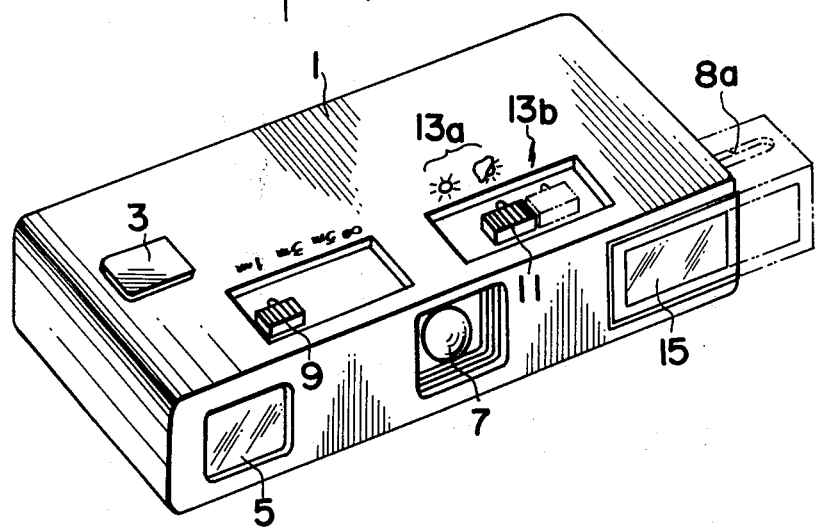
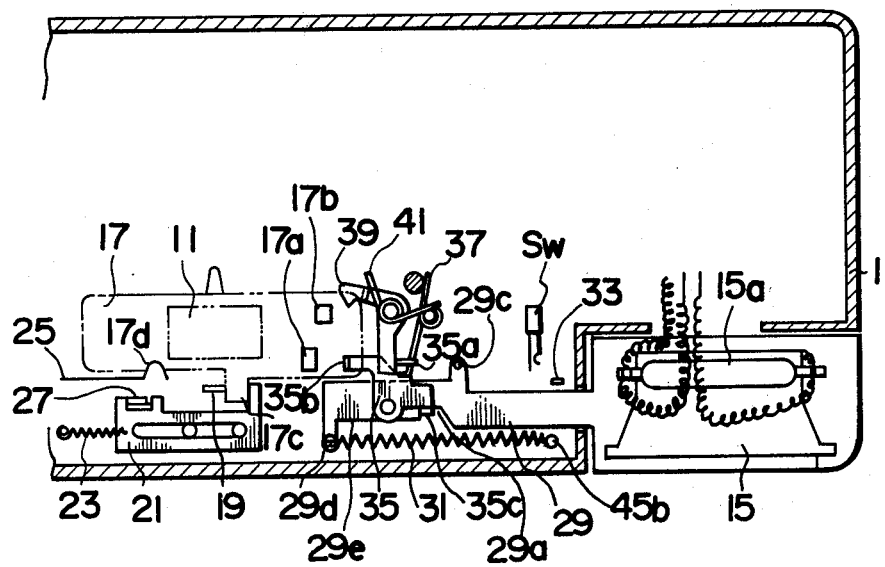

CAMERA INCORPORATING AN ELECTRONIC FLASH DEVICE

BACKGROUND OF THE INVENTION

The present invention relates generally to improvements in cameras having a self-contained flash device and it relates more particularly to an improved camera in which an electronic flash device incorporated therein is movable to a projecting position with a portion thereof projecting beyond a face of the camera body.

A camera has been proposed having therein a movable flash device and being so constructed that a power source circuit for the flash is closed and a diaphragm aperture is interconnected with a distance setting mechanism, when the camera is set for flash photographing operation.

In the camera of this type, the shifting of the flash emitting portion to its extended or projecting position and other preparatory operations for flash photography are effected by an operating member provided for the exclusive use therefor. Accordingly, the conventional camera has at least two movable members, one for the preparation for flash photography and the other for the setting of the diaphragm, although they are used alternatively. In other words, the photographer must remove his finger from a position for setting the diaphragm aperture to a position for changing the photographing mode of the camera, when he wants to establish the flash photographing conditions.

The provision of two operating members projecting from the surface of the camera is unfavorable from the view point of camera design. Another disadvantage is that the smooth and reasonable operation of the camera is obstructed.

The present invention is directed to avoiding the aforesaid shortcoming by providing a diaphragm setting member which may effect not only the setting of the diaphragm for daylight photography but also the aforesaid preparatory operations for flash photography, thereby attaining a smooth and reasonable operation for controlling the diaphragm aperture.

In a camera which includes a movable flash device, because of the considerable weight and volume of the flash emitting portion, difficulty is encountered in returning the flash emitting portion to its retracted position, only by returning the diaphragm setting member from its specific position for flash photography to a diaphragm setting position for daylight photography. However, this type of camera may be constructed so that the flash emitting portion itself is manually pushed back. In case such a mechanism is provided in the above camera which has a diaphragm setting member used for setting the diaphragm aperture and changing the mode of camera operation, if the diaphragm setting member can be set to an arbitrary position, irrespective of the position of the flash emitting portion, there arises the possibility that the diaphragm setting member indicates a diaphragm setting position for daylight photography, while the flash emitting portion is set to its projecting position, despite the fact that the diaphragm setting mechanism is coupled to a distance setting mechanism, with the result that the photographer would commit a mistake by observing that the diaphragm has been set in response to the position of the diaphragm setting member, upon taking a picture. This leads to the disadvantage that an improper exposure is thus obtained.

SUMMARY OF THE INVENTION

It is accordingly a principal object of the present invention to provide an improved camera including a movable flash device, in which the camera diaphragm setting member is locked in a predetermined position provided for flash photography when the flash emitting portion remains in its extended or projecting position, and is thus prevented from shifting to a diaphragm setting position for daylight photography, and thereby avoiding the shortcomings explained above.

It is another object of the present invention to provide an improved camera including a movable flash device in which a diaphragm setting member is provided which functions to effect not only the setting of the diaphragm for daylight photography but also the preparatory operations for flash photography, thereby achieving a smooth and reasonable operation for controlling the diaphragm aperture.

It is a further object of the present invention to provide an improved camera including a movable flash device, which camera has a minimum of operation members which project beyond the surface of the camera body thereby resulting in a camera, smart and simple in appearance.

However, when a relatively heavy flash emitting portion as above is driven from its retracted position to its projecting position by means of a spring, then the flash emitting portion possesses considerable momentum at the terminating end of its stroke, and hence considerable shock occurs when the flash emitting portion is stopped in its projecting position. Thus, according to another embodiment of the present invention, the aforesaid shock may be effectively moderated by a simple buffer mechanism.

The above and other objects of the present invention will become apparent from a reading of the following description taken in conjunction with the accompanying drawings which illustrate preferred embodiments thereof.

BRIEF DESCRIPTION OF THE DRAWINGS

FIG. 1 is a front perspective view of a camera embodying the present invention;

FIG. 2 is a partial plan view thereof with the casing being fragmented to expose the improved mechanism in accordance with a first embodiment of the present invention;

DETAILED DESCRIPTION OF THE PREFERRED EMBODIMENTS

Figure 3A:
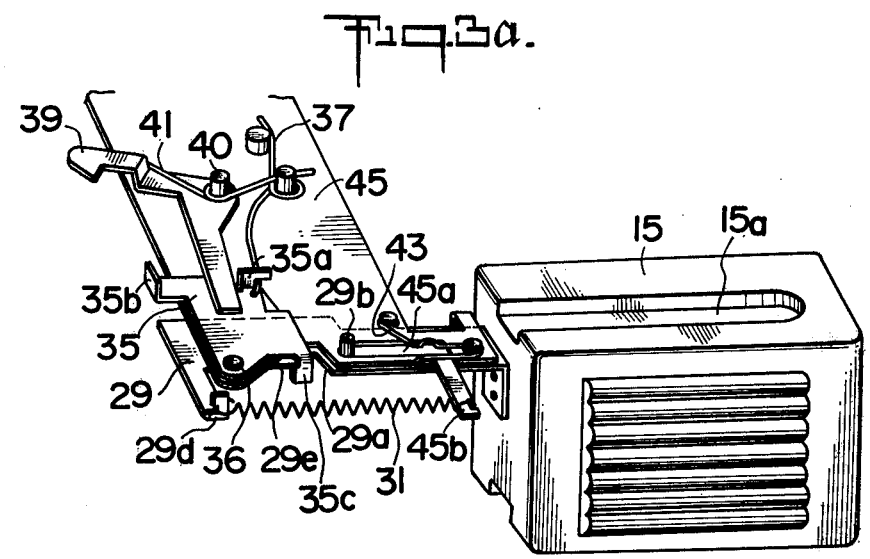
FIG. 3(a), (b) are enlarged partial perspective views of portions thereof.

Referring now to the drawings, particularly FIGS. 1 to 5 thereof which illustrate a preferred embodiment of the present invention as applied to a camera of the 110 type, which employs a 110 type film cartridge of Eastman Kodak Company. The camera includes a camera body 1, a shutter release button 3, a finder window 5 and an objective lens 7, which is adapted to move back and forth along the photographing optical axis in response to the set position of distance setting member 9 for adjustment of focusing. A diaphragm setting member 11 indicates the diaphragm apertures in terms of weather marks 13a representing clear and cloudy weather. Thus, by setting diaphragm member 11 to either one of the weather marks, depending on the weather conditions at the time of photography, a desired diaphragm-aperture setting for daylight photography may be achieved. A body of flash emitting portion 15 is retracted within the camera contour or periphery when the camera is set to the condition for daylight photography, as shown by a solid line. When the diaphragm setting member 11 is set to a flash mark 13b representing flash photography as shown by phantom line, a part of the body of flash emitting portion 15 is shifted to its projecting or extended position outside the contour or beyond the periphery of the camera body, as shown by a phantom line. This extension of flash emitting portion 15 prevents so-called red-eye phenomenon, i.e., when the flash emitting portion is positioned close to an objective lens, then the eyes of a person taken with the flash photography appear red in a picture.

FIG. 2 shows the mechanism of the improved camera with the diaphragm setting member 11 set to one weather mark 13a. Diaphragm setting member 11 is secured to a slidable operating member 17 on which is mounted a releasing pin 17a and an engaging pin 17b both located at the right-hand end thereof. Abutting the right-hand edge of a transverse operating projection 17c of member 17 is a transfer means defining change-over plate 21 biased by a spring 23 to the left as viewed in the drawing. Engaging the left-hand edge of operating projection 17c is an interlocking means defining diaphragm interlocking member 19 which governs or adjusts the diaphragm aperture, depending on the position of the diaphragm setting member 11. A projecting portion of a click spring 25 engages a cut-away portion 17d of member 17, when diaphragm setting member 11 is set to a position as shown in FIG. 1. When the diaphragm setting member 11 is set to flash mark 13b, then the FM setting member 27 causes a diaphragm setting mechanism to be coupled or interlocked to a distance setting mechanism by a known means not shown, so that the diaphragm aperture value is automatically varied for a optimum exposure, in response to the distance set, thus providing a so-called flashmatic mechanism (FM mechanism). Meanwhile, at this time, diaphragm interlocking member 19 is disengaged from operating projection 17c.

As shown in detail in the perspective view of FIG. 3a, a movable plate 29 is secured to an extends from the flash emitting portion 15 and moves jointly with the flash emitting portion 15. Formed in movable plate 29 is a locking cut-away portion 29a, with which a first locking lever 35 to be described later is in engagement. A guide pin 29b is carried on movable plate 29 and projects through and is adapted to slidingly move along an elongated guide slot 45a formed in supporting plate 45 secured to the camera body. A flash-power-source switch SW is so positioned that when the flash emitting portion 15 is moved to its projecting position, switch SW is closed by means of a switch actuating pin 29c provided on movable plate 29. A spring 31 is provided between one end 29d of movable plate 29 and a spring holding element 45b on supporting plate 45 and urges the flash emitting portion 15 towards its projecting position (to the right in the drawing). When the flash emitting portion 15 is moved to its projecting position, a stop 33 abuts the movable plate 29, thereby stopping flash emitting portion 15 to limit its outward movement.

A first locking lever 35 is pivoted to a shaft 36, locks flash emitting portion 15 in its retracted position, and is so biased by a spring 37, so as to rotate in the counterclockwise direction, as viewed in the drawing. When the flash emitting portion 15 remains in its retracted position, then locking arm 35c of locking lever 35 engages cut-away portion 29a in movable plate 29, and when flash emitting portion 15 is advanced out of its retracted position, locking arm 35c contacts side edge 29c of movable plate 29 under the action of the spring. A second locking lever 39 is pivoted to shaft 40, locks operating plate 17 in a predetermined position, and is so loaded by a spring 41 as to rotate in the counterclockwise direction, so that one arm thereof is urged against a first bent portion 35a of first locking lever 35 at all times, and the other arm thereof is formed with a hook portion adapted to engage locking pin 17b. A second bent portion 35b is formed on one arm of first locking lever 35, and release pin 17a is adapted to engage and abut second bent portion 35b.

Figure 3B:
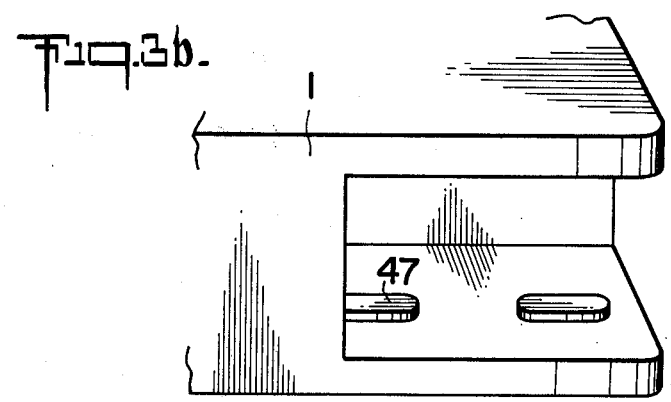
Figure 4:
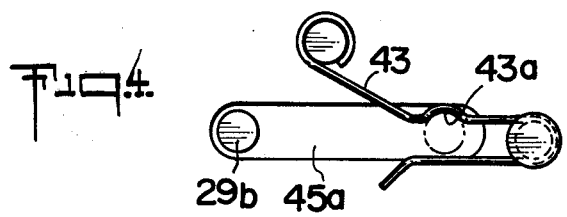
FIG. 4 is an enlarged top plan view of the buffer spring employed in the mechanism.

Guide grooves 15a, 15a are provided in the top and bottom surfaces of flash emitting portion 15, as shown in FIG. 3(a). Guide rails 47 formed on a camera body as shown in FIG. 3(b) are adapted to be fitted in and slidably engage guide grooves 15a, whereby the flash emitting portion 15 is guided by a rail-groove guide mechanism so as to be linearly transversely movable back and forth. The guide rails and grooves may be provided in a manner opposite to the above arrangement. In short, it is sufficient that the guide rails are guided by the guide grooves so as to slidingly move therealong. A buffer spring 43 may elastically receive guide pin 29b of the movable plate 29, immediately before flash emitting portion 15 reaches its fully projecting position, thereby absorbing the momentum of the flash emitting portion 15. Thus, when the flash emitting portion 15 reaches its fully projecting position, guide pin 29b is received by the indended or concavely arcuate holding portion 43a of buffer spring 43, as shown by a phantom line in FIG. 4.

Figure 5:
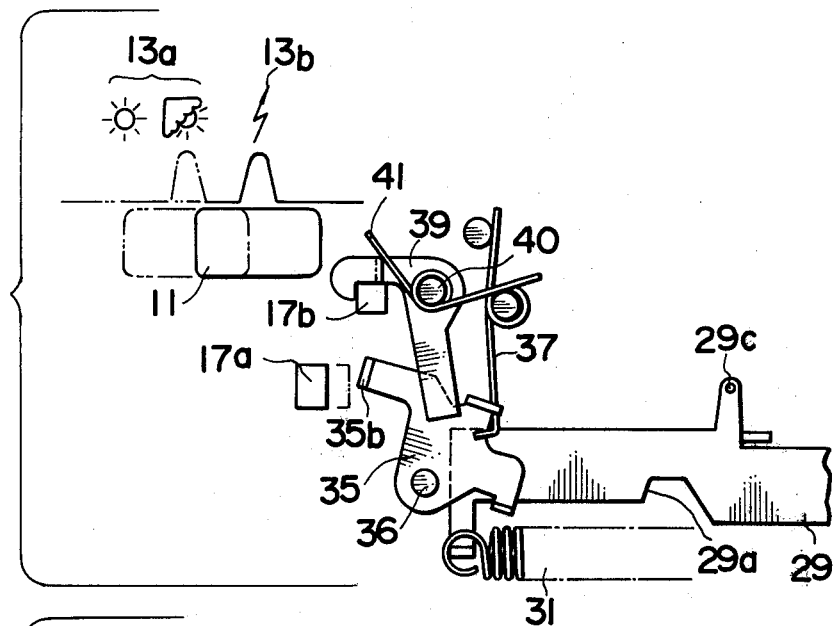
FIG. 5 is a top plan view illustrative of the operation of the first embodiment.

In the operation of the above-described mechanism when the diaphragm setting member 11 is moved to the position of flash mark 13b as shown in FIG. 5, then release pin 17a engages the second bent portion 35b of first locking lever 35 thereby rotating first locking lever 35 in the clockwise direction against the action of spring 37, so that its locking arm 35c is disengaged from a cut-away portion 29a. As a result, flash emitting portion 15 and movable plate 29 are advanced to the right under the influence of spring 31, until the flash emitting portion 15 is stopped in its fully projecting or advanced position, whereas the power-source switch SW is closed. At the same time, the second locking lever 39 follows the movement of first locking lever 35 so as to engage locking pin 17b, thereby preventing the leftward movement of operating plate 17 due to the action of spring 23. The rightward movement of operating plate 17 stretches spring 23, while shifting change-over plate 21 to the right, with the result that a distance setting mechanism is coupled to or cooperates with a diaphragm setting mechanism by means of an FM setting member. In this manner, the preparatory operation for flash photography may be completed, and then a photographer may depress shutter release button 3 for flash photography, after confirming the fully charged condition for the flash emitting capacitor.

For returning to the daylight photography mode, the flash emitting portion 15 is pushed back against the action of spring 31, and when the flash emitting portion reaches its retracted position, first locking lever 35 rotates in the counterclockwise direction under the action of spring 37, so that its locking arm 35c engages cut-away portion 29a in movable plate 29. As a result, flash emitting portion 15 is locked in its retracted position by way of movable plate 29, while the second locking lever 39 is pushed by first locking lever 35 so as to rotate in the clockwise direction, thereby releasing locking pin 17b and operating plate 17 from its locked condition. Operating plate 17 moves to the left under the action of spring 23, and stops due to click spring 25 engaging cut-away portion 17d. Meanwhile, spring 23 is so arranged so as not to act on operating plate 17 appreciably, when the diaphragm setting member remains in its diaphragm setting position for daylight photography.

Figure 6:
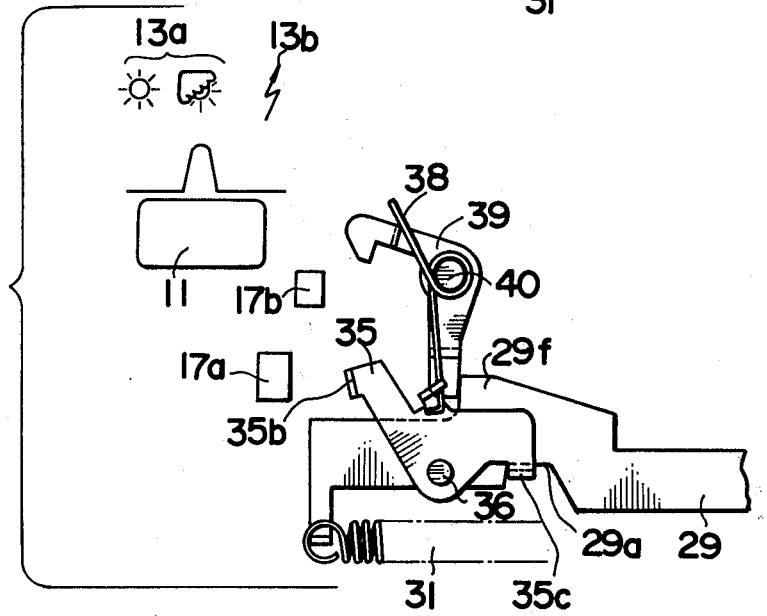
FIGS. 6 and 7 are top plan views illustrative of the operation of a modified locking mechanism in accordance with another embodiment of the present invention.
Figure 7:
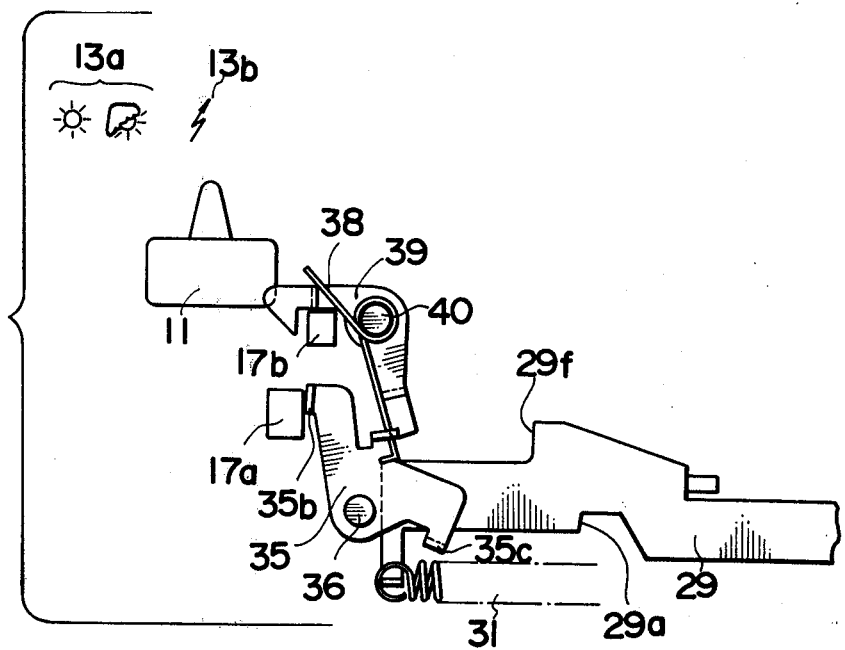

FIGS. 6 and 7 show another embodiment of the present invention differing from the first embodiment primarily with respect to the control of the second locking member, like parts being designated by like reference numerals for common use with the first embodiment. In this embodiment, first and second locking levers 35, 39 are loaded by a single common spring 38 in a manner that, when the flash emitting portion 15 remains in its retracted position, one arm of second locking member 39 abuts one side 29f of movable plate 29 under the influence of the spring, as shown in FIG. 6, so that movement of locking lever 39 to its locking position is prevented. On the other hand, when the flash emitting portion 15 is moved to its projecting position, then as shown in FIG. 7, side 29f is separated from second locking lever 39, thereby permitting locking lever 39 to move to its locking position. Meanwhile, according to the both first and second embodiments, diaphragm setting member 11, when set to a predetermined position, is moved to the right to an extent more than required, beforehand; release pin 17a rotates first locking lever 35 to an extent that there is provided a clearance between its locking arm 35c and movable plate 29; and when second locking lever 39 is moved to its locking position as shown in FIG. 7, locking pin 17b leaves a clearance between pin 17b and the hook portion. When the diaphragm setting member is freed, then operating plate 17 is returned to the left until locking pin 17b abuts the hook portion of second locking lever 39; release pin 17a is separated from the first locking lever; first locking lever 35 rotates slightly in the clockwise direction; and the locking arm thereof contacts lower side 29e of movable plate 29 under the spring influence.

As is apparent from the foregoing description, the diaphragm setting portion permits diaphragm setting not only for daylight photography but also for flash photography, thus facilitating the operation of the diaphragm setting member, without a risk of any operational error. The positiveness and safety of the diaphragm setting operation may be further improved according to the diaphragm setting member locking mechanism as descirbed in conjunction with the embodiment of the invention.

While there have been described and illustrated preferred embodiments of the present invention, it is apparent that numerous alterations omissions and additions may be made without departing from the spirit thereof.

We claim:

1. In a camera including a body and an objective lens, having an adjustable diaphragm and means for focussing said objective lens and first adjusting means for adjusting said diaphragm in response to said focussing means and second adjusting means for adjusting said diaphragm independently of said focussing means and means for alternatively enabling one of said first and second means;

an electronic flash device including a light emitting member moveable between a retracted position within said camera body and an extended position projecting beyond said camera body, spring means biasing said light emitting member toward its extended position, first lock means for releasably locking said light emitting member in its retracted position, a control member for controlling said second adjusting means and for disabling said second adjusting means and enabling said first adjusting means at a predetermined position of said control member, means responsive to said control member being at said predetermined position for releasing said first lock means so that said flash device moves to its extended position and means for locking said control member in said predetermined position in response to said light emitting member being in its extended position.

2. The camera of claim 1 comprising means responsive to the retraction of said light emitting member for unlocking said control member for movement from said predetermined position and for enabling said second adjusting means and disabling said first adjusting means.

3. The camera of claim 1 comprising means responsive to the retracted and extended positions of said light emitting member respectively disabling and enabling said flash device.

4. A camera incorporating an electronic flash device and including a body and objective lens, comprising:
    a flash emitting portion moveable between a projecting position, where at least part of said flash emitting portion projects from the contour of the camera body, and a retracted position;
    a power switch for said flash device;
    a spring member urging said flash emitting portion toward its projecting position;
    a first locking means for locking said flash emitting portion in its retracted position against the influence of said spring member;
    a distance setting member for adjusting the focus of said objective lens;
    a diaphragm setting member settable to a predetermined position for flash photography and at least one normal position for normal diaphragm setting;
    a second locking means movable to a locking position with the releasing of said flash emitting portion from its locked condition for locking said diaphragm setting member in said predetermined position;
    an interlocking means for interlocking said diaphragm setting member with a diaphragm mechanism so that the diaphragm aperture is determined in accordance with the position of said diaphragm setting member;
    transfer means moveable to an operating position for interlocking said distance setting member with said diaphragm mechanism so that the diaphragm aperture is determined in accordance with the position of said distance setting member;
    releasing means cooperative with said diaphragm setting member for releasing the lock of said flash emitting portion, when said diaphragm setting member is set to said predetermined position so that said flash emitting portion moves to its projecting position; and means for closing said power switch, moving said transfer means to the operating position and deactuating said interlocking means with the movement of said flash emitting portion from a retracted position to a projecting position.

5. A camera as set forth in claim 1, wherein said second locking means is normally urged to its locking position and is operative coupled to said flash emitting portion when said flash emitting portion is in its retracted position and is movable to its locking position in response to the movement of said flash emitting portion from its retracted position to its projecting position.

6. A camera as set forth in claim 5, wherein first locking means includes a first locking member normally urged to its locking position and operative coupled to said flash emitting portion, and a cut-away portion is provided in a surface movable with said flash emitting portion, said first locking member engaging said cut-away portion, when said flash emitting portion is in its retracted position.

7. A camera as set forth in claim 6, wherein said second locking member abuts said first locking member.

8. A camera as set forth in claim 7, wherein said camera includes:
a guide mechanism, said flash emitting portion being movable between its retracted position and its projecting position, while being guided linearly by said guide mechanism which comprises a combination of linear grooves and guide members adapted to be fitted in said grooves so as to slidingly move therealong:
a movable plate secured to said flash emitting portion biased towards the projecting position of said flash emitting portion, and formed with a cut-away portion in one of its sides;
a first locking means included first locking lever urged against said movable plate and engaging said cut-away portion in said movable plate, when said flash emitting portion is in its retracted position, thereby locking said flash emitting portion in its retracted position;
a second locking means included second locking lever abutting said movable plate, when said flash emitting portion is in its retracted position, and prevented from its movement towards its locking position, when said flash emitting portion is in its retracted position;
an operating plate, to which are secured a release pin that is movable jointly with said diaphragm setting member and abuts said first locking lever, and an engaging pin adapted to engage said second locking lever, when said diaphragm setting member is set to its predetermined position, said operating plate being urged towards a diaphragm setting position for daylight photography;
means releasably holding said operating plate in said diaphragm setting position for daylight photography;

change-over means cooperative with said operating plate and bringing said diaphragm mechanism into interlocking relation to said distance setting mechanism, when said diaphragm setting member is set to said predetermined position; and
a flash power source switch actuated by means of said movable plate, and closed when said flash emitting portion is in its projecting position.

9. A camera as set forth in claim 1, wherein said camera further includes a pin movable jointly with said flash emitting portion, and a buffer member engaged by said pin immediately before said flash emitting portion reaches its fully projecting position.

10. A camera as set forth in claim 9, wherein said buffer member consists of a U-shaped wire spring adapted to hold said pin between its legs.

11. A camera as set forth in claim 1, wherein said diaphragm setting member is urged towards a diaphragm setting position for daylight photography, when set to said predetermined position.

12. A camera incorporating an electronic flash device and including a body and objective lens, comprising:
a flash emitting portion moveable between a projecting position, where at least part of said flash emitting portion projects from the contour of the camera body, and a retracted position;
a power switch for said flash device;
a spring member urging said flash emitting portion towards its projecting position;
a first locking means for locking said flash emitting portion in its retracted position against the influence of said spring member;
a diaphragm setting member settable to a predetermined position for flash photography and at least one normal position for normal diaphragm setting;
a second locking means moveable to a locking position with the releasing of said flash emitting portion from its locked conduction for locking said diaphragm setting member in said predetermined position;
releasing means cooperative with said diaphragm setting member for releasing the lock of said flash emitting portion, when said diaphragm setting member is set to said predetermined position so that said flash emitting portion moves to its projecting position; and
means for closing said power switch, when said flash emitting portion is in its projecting position.

13. A camera as set forth in claim 12, wherein said camera further includes a pin moveable with said flash emitting portion, and a buffer member engaged by said pin immediately before said flash emitting portion reaches its fully projecting position.

14. A camera as set forth in claim 13, wherein said buffer member includes a U-shaped wire spring adapted to hold said pin between its legs.

15. A camera as set forth in claim 12, wherein said diaphragm setting member is urged towards a diaphragm setting position for daylight photography, when set to said predetermined position.

* * * * *

UNITED STATES PATENT AND TRADEMARK OFFICE
CERTIFICATE OF CORRECTION

PATENT NO. : 4,166,681
DATED : September 4, 1979
INVENTOR(S) : Toshinori Imura and Akira Yamanaka It is certified that error appears in the above-identified patent and that said Letters Patent are hereby corrected as shown below:

5. A camera as set forth in claim 4, wherein said...

9. A camera as set forth in claim 4, wherein said...

11. A camera as set forth in claim 4, wherein said...

Signed and Sealed this

Fifteenth Day of April 1980

[SEAL]

Attest:

SIDNEY A. DIAMOND

Attesting Officer        Commissioner of Patents and Trademarks